(12) United States Patent
Kelemen et al.

(10) Patent No.: US 9,193,594 B2
(45) Date of Patent: Nov. 24, 2015

(54) SYSTEMS AND METHODS FOR ENHANCING RATES OF CARBONATION OF PERIDOTITE

(75) Inventors: Peter B. Kelemen, Hastings on Hudson, NY (US); Jurg M. Matter, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 990 days.

(21) Appl. No.: 13/383,082

(22) PCT Filed: Jul. 7, 2010

(86) PCT No.: PCT/US2010/041170
§ 371 (c)(1),
(2), (4) Date: Mar. 7, 2012

(87) PCT Pub. No.: WO2011/005831
PCT Pub. Date: Jan. 13, 2011

(65) Prior Publication Data
US 2012/0164042 A1 Jun. 28, 2012

Related U.S. Application Data

(60) Provisional application No. 61/224,707, filed on Jul. 10, 2009, provisional application No. 61/261,891, filed on Nov. 17, 2009, provisional application No. 61/327,853, filed on Apr. 26, 2010, provisional (Continued)

(51) Int. Cl.
*C01F 5/24* (2006.01)
*C01F 11/18* (2006.01)
(Continued)

(52) U.S. Cl.
CPC . *C01B 31/24* (2013.01); *C01F 5/24* (2013.01); *C01F 11/18* (2013.01); *B01D 2257/504* (2013.01); *Y02C 10/04* (2013.01)

(58) Field of Classification Search
None
See application file for complete search history.

(56) References Cited

U.S. PATENT DOCUMENTS 3,709,300 A 1/1973 Pye
5,069,283 A 12/1991 Mack
(Continued)

FOREIGN PATENT DOCUMENTS

NL 1028399 8/2006
WO 2008128331 A1 10/2008

OTHER PUBLICATIONS

International Search Report and the Written Opinion of the International Searching Authority, International Application No. PCT/US2010/041170, filed Jul. 7, 2010.
(Continued)

*Primary Examiner* — Stuart Hendrickson
*Assistant Examiner* — Daniel Berns
(74) *Attorney, Agent, or Firm* — Wiggin and Dana LLP; Anthony P. Gangemi

(57) ABSTRACT

Methods and systems for enhancing rates of carbonation of peridotite both in situ and ex situ are disclosed. In some embodiments, the methods and systems include the following: fracturing a volume of peridotite; heating the volume of peridotite; injecting an adjustable flow of carbon dioxide into the volume of peridotite; injecting bicarbonate materials into the volume of peridotite; and forming carbonate with the volume of peridotite and the carbon dioxide in an exothermic reaction thereby generating a self-sustaining heat source, the heat source heating the volume of peridotite.

20 Claims, 10 Drawing Sheets

Related U.S. Application Data application No. 61/327,899, filed on Apr. 26, 2010, provisional application No. 61/328,232, filed on Apr. 27, 2010, provisional application No. 61/331,184, filed on May 4, 2010.

(51) Int. Cl.

| | | |
|---|---|---|
| *B01J 8/00* | (2006.01) | |
| *B01D 53/62* | (2006.01) | |
| *B01D 53/80* | (2006.01) | |
| *B01D 53/79* | (2006.01) | |
| *C01B 31/24* | (2006.01) | |

(56) References Cited

U.S. PATENT DOCUMENTS 6,911,418 B2   6/2005   Frenier
2007/0217981 A1   9/2007   Van Essendelft

OTHER PUBLICATIONS

Kelemen, P.B., et al., "In situ carbonation of peridotite for CO2 storage," Proceedings of the National Academy of Sciences, vol. 105, No. 45, pp. 17296-17300, Nov. 11, 2008.

Bearat, H., et al., "Carbon Sequestration via Aqueous Olivine Mineral Carbonation: Role of Passivating Layer Formation," Environmental Science and Technology, vol. 40, No. 15, pp. 4802-4808, 2006.

Minarik, W., "Complications to Carbonate Melt Mobility due to the Presence of an Immiscible Silicate Melt," Journal of Petrology, vol. 39, Nos. 11 & 12, pp. 1965-1973, Nov. 1998.

Bachu, S., "CO2 storage in geological media: Role, means, status and barriers to deployment," Progress in Energy and Combustion Science, vol. 34, pp. 254-273, 2008.

Supplemental European Search Report, International Application No. PCT/US2008/088619, dated Jul. 16, 2012.

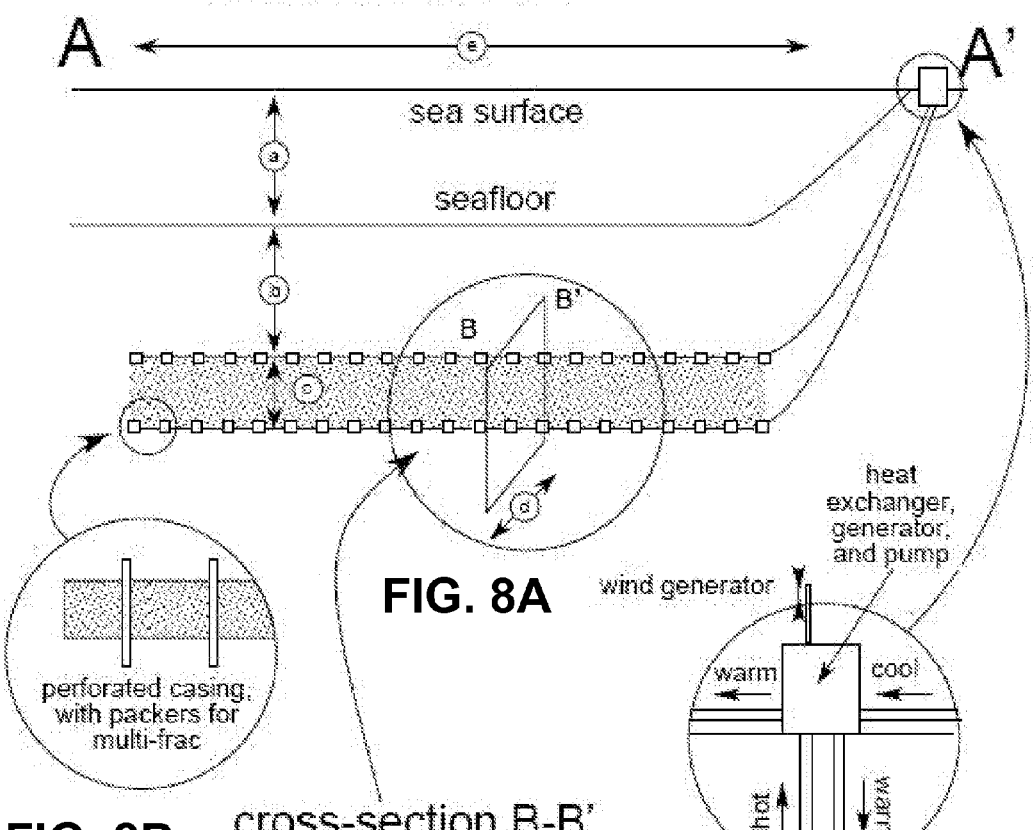
FIG. 8A
FIG. 8B
FIG. 8D
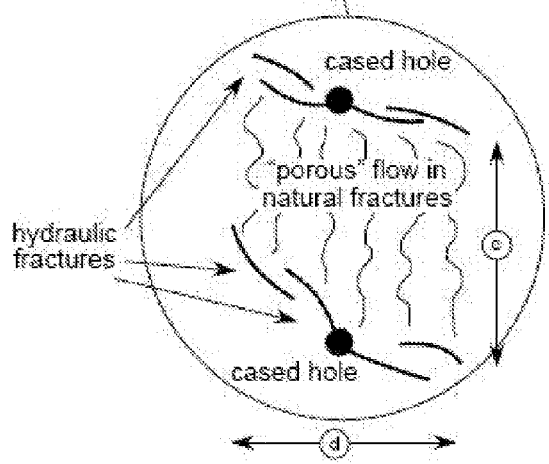
FIG. 8C

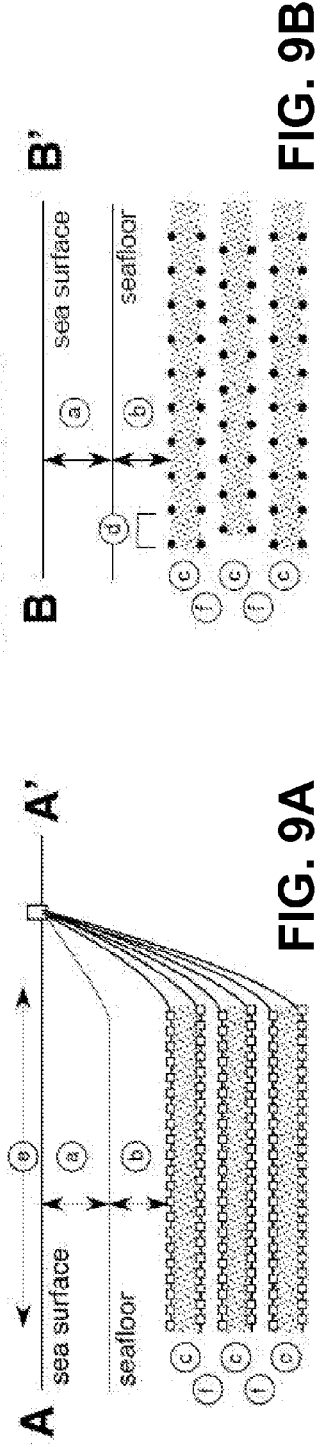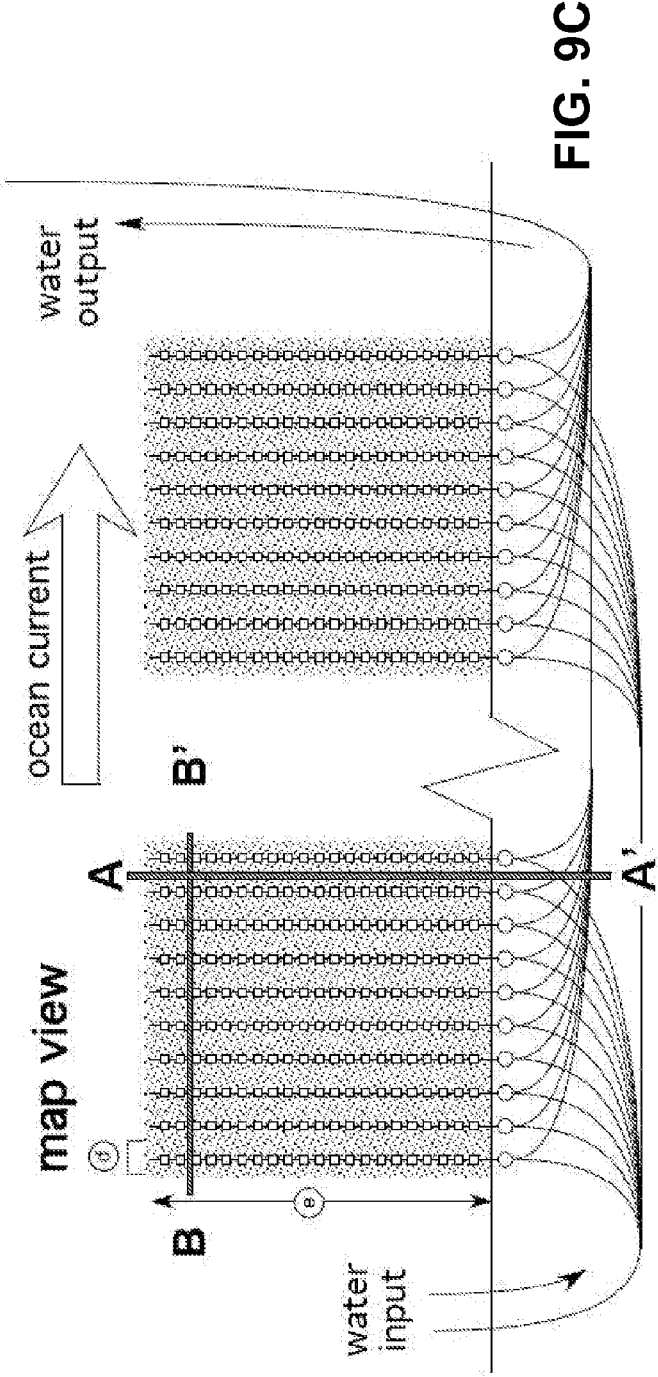

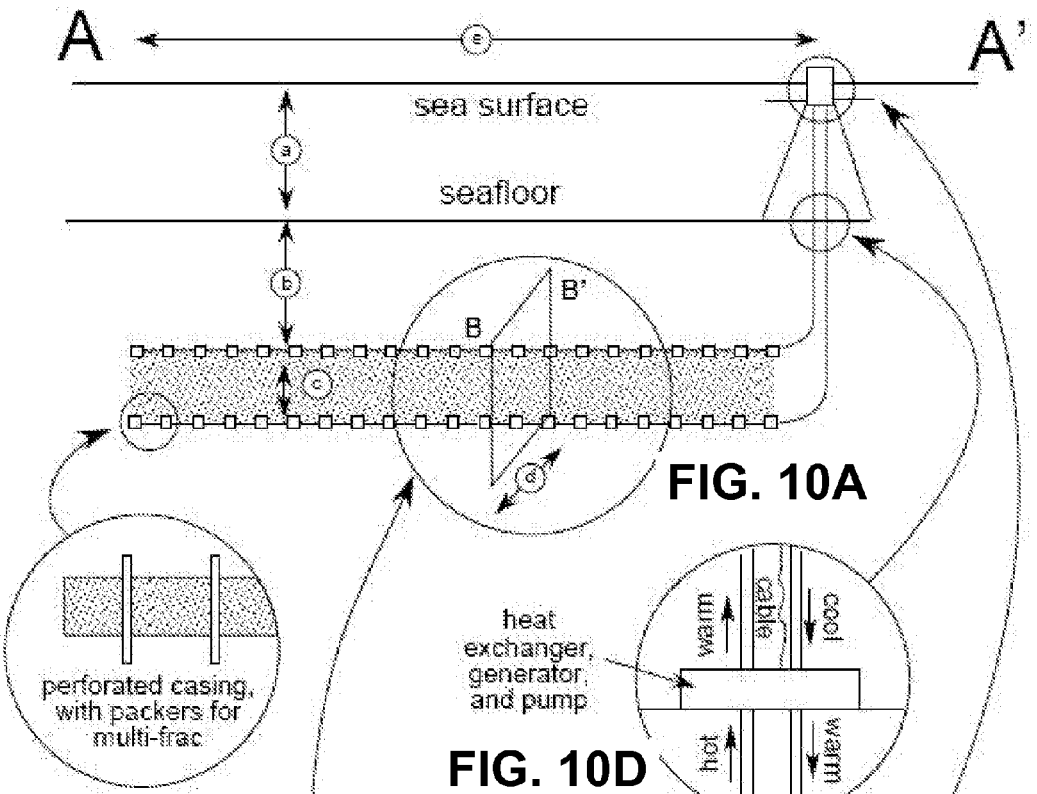
FIG. 10A
FIG. 10D
FIG. 10B
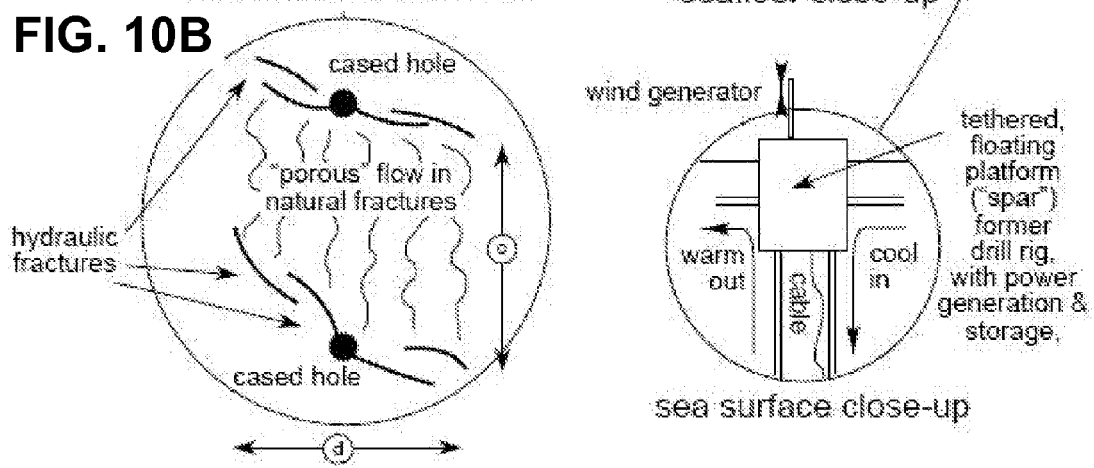
FIG. 10C
FIG. 10E

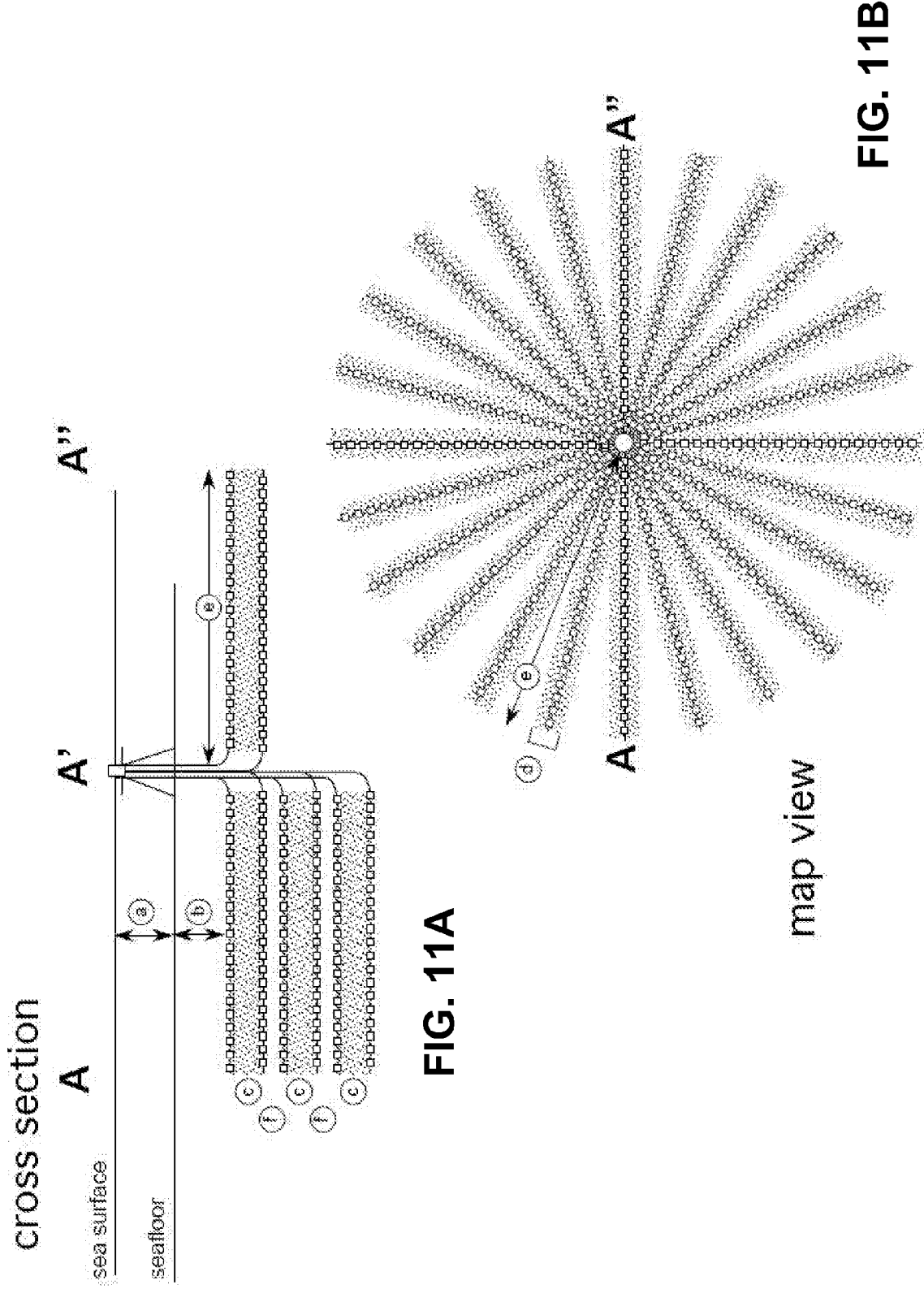

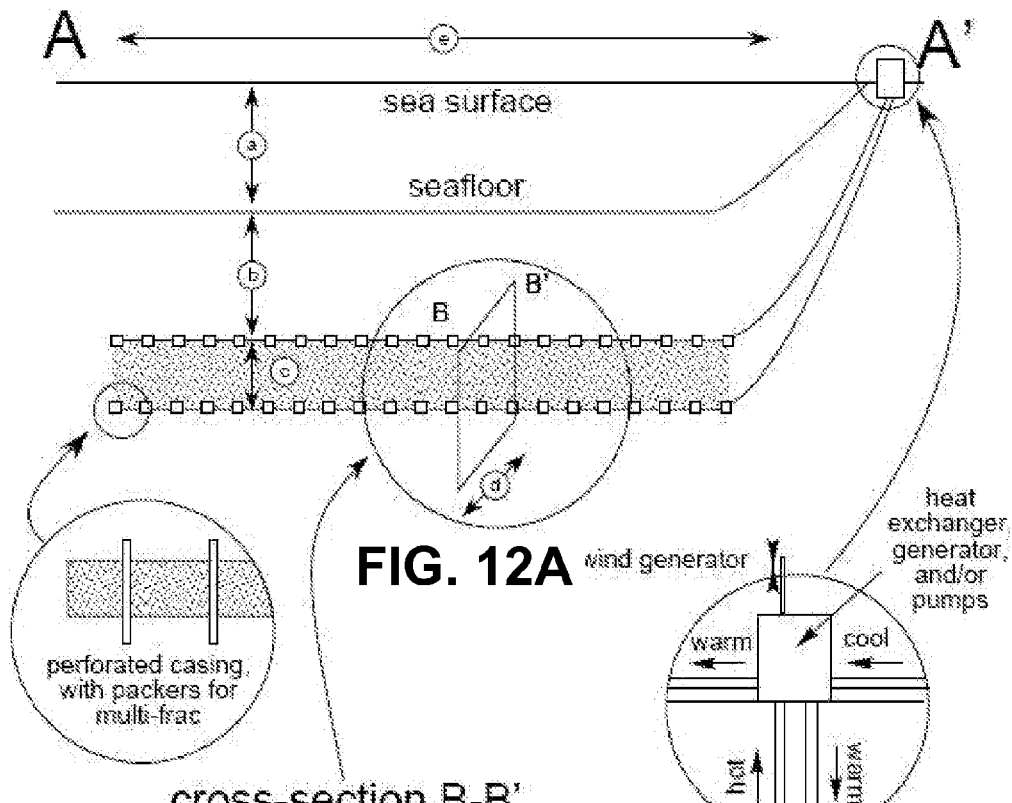
FIG. 12A
FIG. 12B
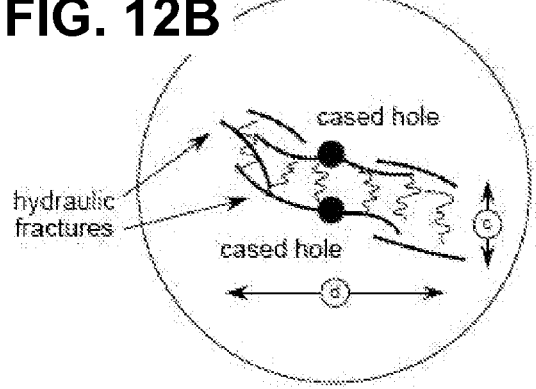
FIG. 12C
FIG. 12D

SYSTEMS AND METHODS FOR ENHANCING RATES OF CARBONATION OF PERIDOTITE

CROSS REFERENCE TO RELATED APPLICATION(S)

This application claims the benefit of U.S. Provisional Application Nos. 61/224,707, filed Jul. 10, 2009, 61/261,891, filed Nov. 17, 2009, 61/327,853, filed Apr. 26, 2010, 61/327,899, filed Apr. 26, 2010, 61/328,232, filed Apr. 27, 2010, and 61/331,184, filed May 4, 2010, each of which is incorporated by reference as if disclosed herein in its entirety.

BACKGROUND

Recognition that anthropogenic carbon dioxide ($CO_2$) input to the atmosphere has substantially increased atmospheric carbon dioxide concentration, coupled with the theory that increased carbon dioxide, in turn, could drive rapid global warming, has focused attention on techniques—known as carbon sequestration—to remove some carbon dioxide from the atmosphere. One possibility is the conversion of carbon dioxide gas to stable, solid carbonate minerals such as calcite ($CaCO_3$) and magnesite ($MgCO_3$).

Because of its high concentration of Mg, tectonically exposed peridotite from the Earth's upper mantle, which is composed largely of the mineral olivine (($Mg,Fe)_2SiO_4$), with lesser proportions of pyroxene minerals (($Mg,Fe,Ca)_2Si_2O_6$) and spinel (($Mg,Fe)(Cr,Al)_2O_4$), and its hydrous alteration product serpentinite, have been considered a promising reactant for conversion of atmospheric carbon dioxide to solid carbonate.

Natural carbonation of peridotite has been found to be surprisingly rapid. For example, carbonate veins in mantle peridotite in Oman have an average $14_C$ age of approximately 26,000 years, and are not 30 to 95 million years old as previously believed. These data and reconnaissance mapping show that approximately 104 to 105 tons per year of atmospheric carbon dioxide are converted to solid carbonate minerals via peridotite weathering in Oman. Mantle peridotite is ordinarily more than 6 km below the seafloor, and is strongly out of equilibrium with air and water at the Earth's surface. Its exposure along large thrust faults and along tectonic plate boundaries creates a large reservoir of chemical potential energy.

Despite the available chemical potential, engineering techniques for carbon sequestration have many challenges. Engineering solutions involve grinding peridotite to a fine powder, purifying carbon dioxide gas, using reaction vessels at elevated pressure, and/or heating reactants to 100 degrees Celsius or more, and this comes at a substantial financial and energy cost.

Various methods have been experimentally evaluated, including direct carbonation of olivine and serpentine powders at elevated temperature, dissolution of serpentine or olivine in hydrochloric acid followed by carbonation of Mg and Ca ions in solution, and reaction of olivine and serpentine with carbonic acid (very similar to natural alteration). Reaction kinetics have been found to be too slow for significant sequestration of carbon dioxide unless the olivine or serpentine reactants are raised to more than 50-100 degrees Celsius, ground to a fine powder, and/or pre-treated at >600 degrees Celsius to increase reactive surface area. For the most part, because of the requirements for heating and processing, these approaches have been found to be too expensive—in financial terms and, more importantly, in energy expenditure—to be commercially viable at present.

SUMMARY

Generally, the disclosed subject matter relates to accelerating and controlling natural peridotite carbonation both in situ and ex situ by optimizing the conditions for carbonation reactions between peridotite and a source of carbon dioxide to be sequestered, e.g., carbon dioxide captured from power plant emissions, carbon dioxide captured from atmospheric air, or carbon dioxide contained in bodies of water local to the peridotite.

Carbonation of olivine and pyroxene, which are components of peridotite, can generally be represented by the following reactions:

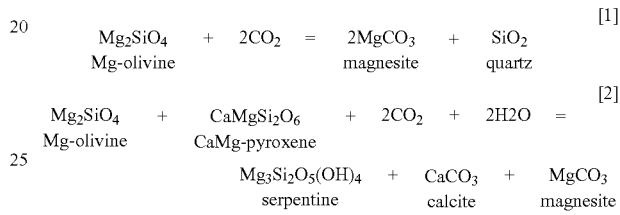

Sequestration of carbon dioxide according to the disclosed subject matter includes facilitating and controlling carbonation reactions [1] and [2] between the carbon dioxide to be sequestered and peridotite.

Some embodiments of the disclosed subject matter include systems and methods for enhancing the rates of carbonation of peridotite. Rates of carbonation can be enhanced by altering the conditions under which reactions [1] and [2] occur. In some embodiments of the disclosed subject matter, drilling, hydraulic fracture, input of carbon dioxide at elevated pressure, input of high concentrations of pH buffering reagents such as $NaHCO_3$ (sodium bicarbonate), $KHCO_3$ (potassium bicarbonate), and $LiHCO_3$ (lithium bicarbonate), and increasing the temperature of the peridotite at depth are used to enhance conditions for reactions [1] and [2].

In some embodiments of the disclosed subject matter, fluid pressure in the peridotite is cycled between fluid-saturated intervals and fluid-free, drying intervals. Fluid pressure cycling promotes supersaturation of solid phases in fluid in intergranular pore spaces and rapid crystallization that locally impinges on pore walls and creates high stress and fracture events. The fracture events or fractures help sustain permeability, porosity, and exposure of un-reacted olivine surfaces to promote continued reaction and formation of carbonate.

Alternatively, some embodiments include controlled convection of local, dissolved carbon dioxide found in adjacent seawater as the source of the carbon dioxide for reaction with the peridotite.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIGS. 8A-8D are schematic diagrams of a system for drilling and injection from shore based sites into the shallow seafloor according to some embodiments of the disclosed subject matter;

FIGS. 9A-9C include cross-section and map views of the system illustrated in FIG. 8;

FIGS. 10A-10E are schematic diagrams of a system for drilling and injection from tethered platforms in the ocean into the shallow seafloor according to some embodiments of the disclosed subject matter;

FIGS. 11A and 11B include cross-section and map views of the system illustrated in FIG. 10; and FIGS. 12A-12D are schematic diagrams of a system for drilling and injection from shore based sites into the shallow seafloor according to some embodiments of the disclosed subject matter.

DETAILED DESCRIPTION

Figure 1:
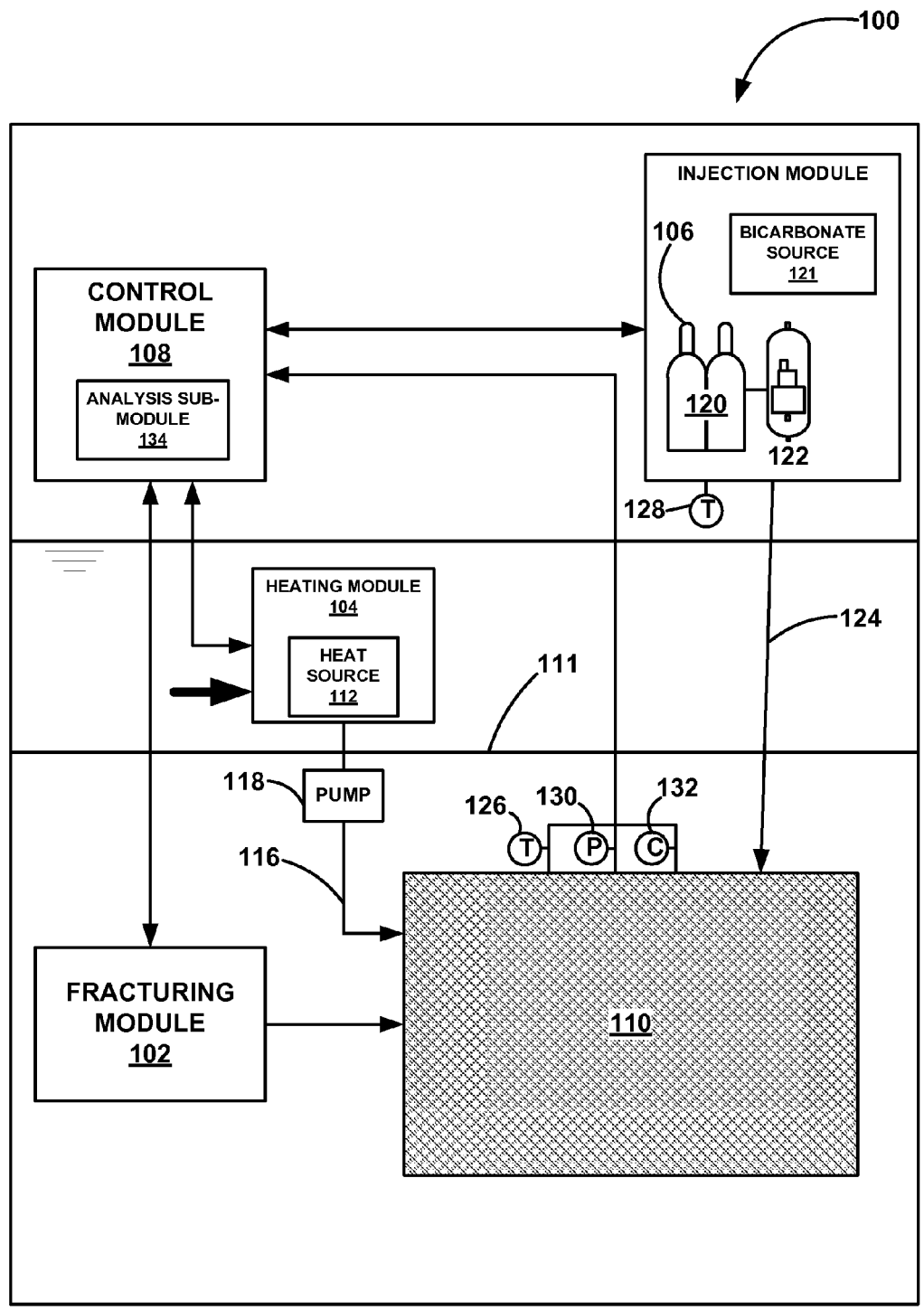
FIG. 1 is a diagram of a system and method according to some embodiments of the disclosed subject matter.
Figure 2:
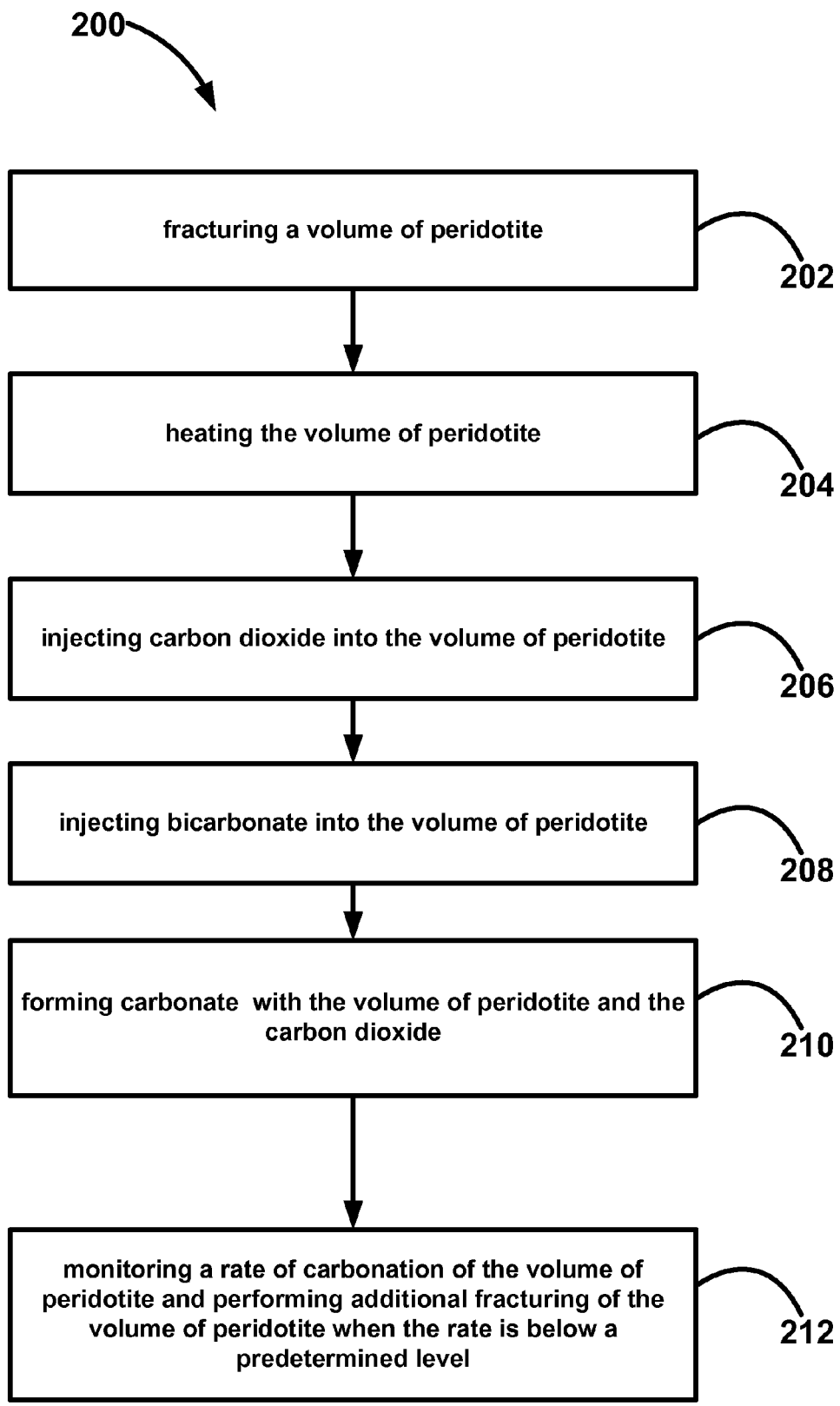
FIG. 2 is a chart of a method according to some embodiments of the disclosed subject matter.

Referring now to FIGS. 1 and 2, some embodiments include systems and methods for sequestering carbon dioxide via carbonation of peridotite both in situ and ex situ. Some embodiments include a system 100 having a fracturing module 102, a heating module 104, an injection module 106, and a control module 108 for facilitating and controlling carbonation reactions.

Fracturing module 102 includes apparatus (not shown) for fracturing a volume 110 of peridotite. Volume 110 is typically located at a depth below a floor 111 of a body of water such as an ocean or sea. In some embodiments, fracturing volume 110 is accomplished using known drilling and hydraulic fracturing techniques and equipment currently used in mineral and petroleum exploration. In some embodiments, holes are drilled in the volume of peridotite for receiving an adjustable flow of carbon dioxide, which can be included in fluid such as seawater. Drilling and hydraulic fracture are used to increase the depth (and volume) of peridotite readily available for reaction by a factor of 200, i.e., from about 15 meters to about 3 km in the peridotite. Additional naturally occurring fracture of peridotite is likely as a result of thermal expansion during heating, volume increase during hydration, and volume increase during carbonation.

Heating module 104 is used to heat volume 110 of peridotite. Heating module 104 includes a heat source 112 for heating a volume of fluid (not shown) thereby creating a heated volume of fluid (not shown), a conduit 116 formed between the heated volume of fluid and volume 110 of peridotite, and a pump 118 for pumping the heated volume of fluid to the volume of peridotite. Because volume 110 of peridotite is generally, but not always, at depth, i.e., under a body of water, seawater covering the peridotite is typically used as the source for the volume of fluid. Preheating the peridotite volume to the optimal temperature for peridotite carbonation, which is about 185 degree Celsius, jump starts the carbonation reaction. Heating the peridotite can be achieved via a variety of flow rates, fluid temperatures, and fluid compositions. Eventually the exothermic heat output from the carbonation reactions will maintain a temperature 185 degrees Celsius in the peridotite volume. Over time, output fluid that is heated by the exothermic heat can be used to heat other areas of the peridotite volume. This likely will occur spontaneously as hot fluid flows into colder, surrounding rock.

Injection module 106 includes a carbon dioxide source 120 that can include carbon dioxide that has been captured from either atmospheric air or power plant emissions, a bicarbonate material source 121, and a compressor 122 for compressing the carbon dioxide thereby increasing the pressure of the carbon dioxide. The pressurized carbon dioxide from carbon dioxide source 120 and bicarbonate material 121 are injected into volume 110 of peridotite via a conduit 124 between the carbon dioxide and bicarbonate sources and the volume of peridotite. If necessary, additional measures can be taken to ensure that the carbon dioxide in carbon dioxide source 120 is substantially purified prior to injection into volume 110. Injection of pure carbon dioxide or a carbon dioxide rich fluid mixture, versus the utilization of dissolved carbon dioxide in surface water, helps keep pace with the enhanced carbonation reaction rate.

Control module 108 includes temperature sensors 126 and 128 for monitoring the temperatures of volume 110 of peridotite and carbon dioxide source 120. Control module 108 includes a pressure sensor 130 for monitoring a pressure of carbon dioxide injected into volume 110 of peridotite and one or more carbonation sensors 132 for monitoring the rate of carbonation occurring in the volume of peridotite. Control module 108 also includes an analysis sub-module 134 for analyzing data generated by temperature, pressure, and carbonation sensors 126, 128, 130, and 132, respectively. Based on the results of the analysis by analysis sub-module 134, fracturing module 102, heating module 104, and carbon dioxide injection module 106 are controlled. For example, control module 108 can be programmed to direct fracturing module 102 to perform additional fracturing of volume 110 of peridotite when the rate of carbonation falls below a predetermined level. Also, control module 108 can be configured so that it discontinues operation of heating module 104 when heat from the carbonation reactions occurring within volume 110 of peridotite is capable of maintaining a temperature of about 185 degrees Celsius in the volume of peridotite.

Referring now to FIG. 2, some embodiments of the disclosed subject matter include a method 200 of enhancing rates of carbonation of peridotite. Typically, but not always, the volume of peridotite is located at a depth beneath a body of water. At 202, method 200 includes fracturing a volume of peridotite. In some embodiments, fracturing of peridotite is achieved via drilling holes in the volume of peridotite for receiving an adjustable flow of carbon dioxide, hydraulic fracturing, or other known technologies. At 204, the volume of peridotite is heated. In some embodiments, the peridotite is heated by injecting heated fluids into the volume of peridotite. The heated fluids are generally injected until the volume of peridotite achieves a temperature of at least about 185 degrees Celsius. At 206, carbon dioxide is injected into the volume of peridotite. Method 200 is typically performed in situ with a volume of peridotite but can also be performed using ex situ grinded peridotite, ex situ not grinded peridotite, and a combination thereof. In some embodiments, the carbon dioxide has a temperature of about 25 degrees Celsius a pressure of about 150 to 300 bars. The flow rate of carbon dioxide is about 0.04 meters per second or other flow rates that help maintain a temperature of about 185 degrees Celsius in the volume of peridotite. At 208, bicarbonate materials are injected into the volume of peridotite. In some embodiments, the bicarbonate materials include at least one of sodium bicarbonate, potassium bicarbonate, and lithium bicarbonate having a concentration of about 1 mole per liter with surrounding fluids. At 210, the volume of peridotite and the carbon dioxide react to form carbonate. The carbonation reaction is exothermic thereby generating a heat source. The heat source further heats and maintains the temperature within the volume of peridotite. At 212, a rate of carbonation of the volume of peridotite is monitored and additional fracturing of the volume of peridotite is performed if the rate falls below a predetermined level.

Although not illustrated, in some embodiments, method 200 includes cycling the fluid pressure in the volume of peridotite so as to form both fluid-saturated intervals and fluid-free, drying intervals in the volume of peridotite. Reaction-driven cracking may also be favored when fluid flow takes place periodically, as may be common in arid areas subject to seasonal or occasionally heavy rainfall. Evaporation of isolated fluid pockets in pore space drives increasing solute concentrations, leading to extreme super-saturation. This, in turn, leads to very high "pressures of crystallization", which may ordinarily be small for crystals with diameters of more than a few microns.

Figure 3:
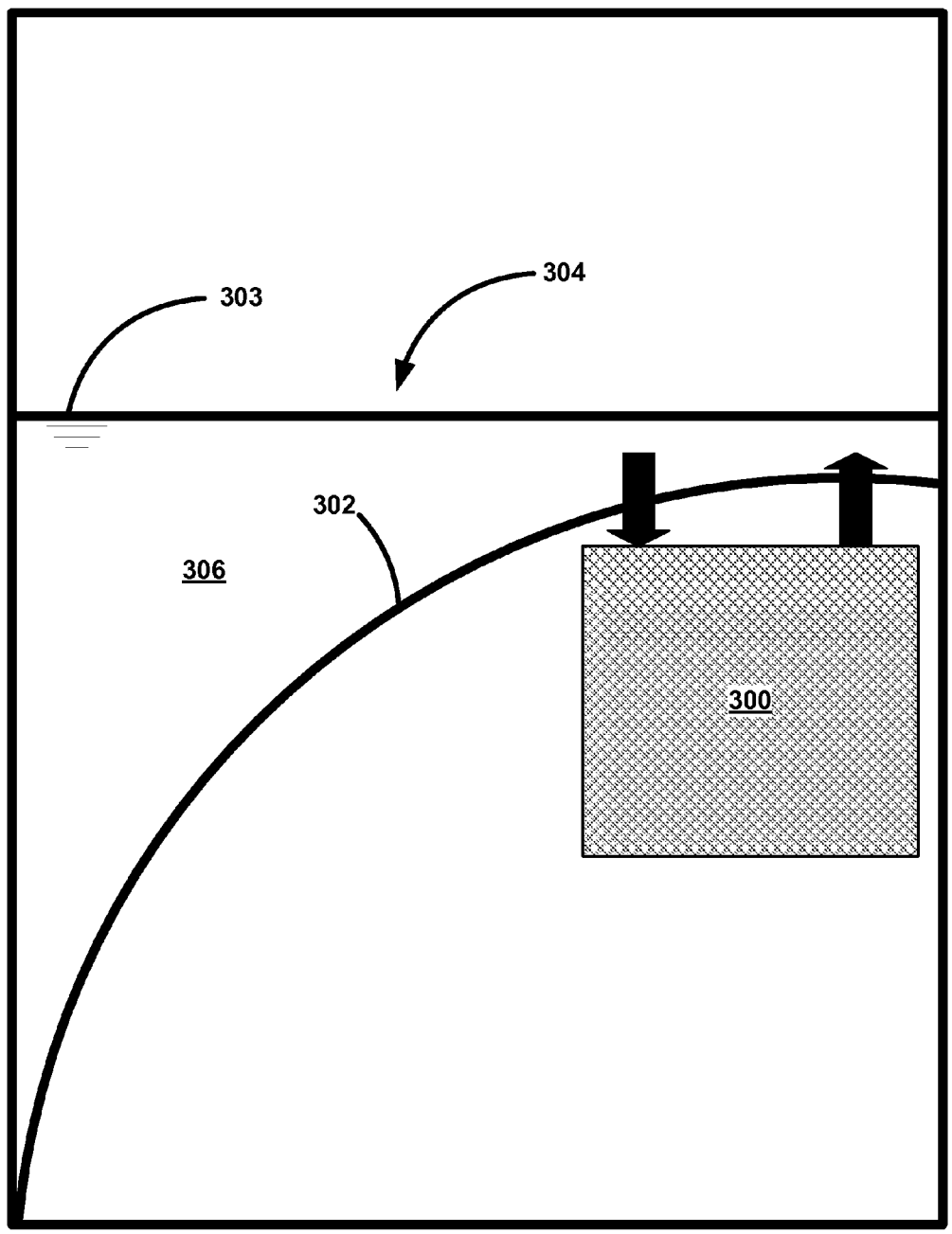
FIG. 3 is a diagram of a system and method according to some embodiments of the disclosed subject matter.
Figure 4:
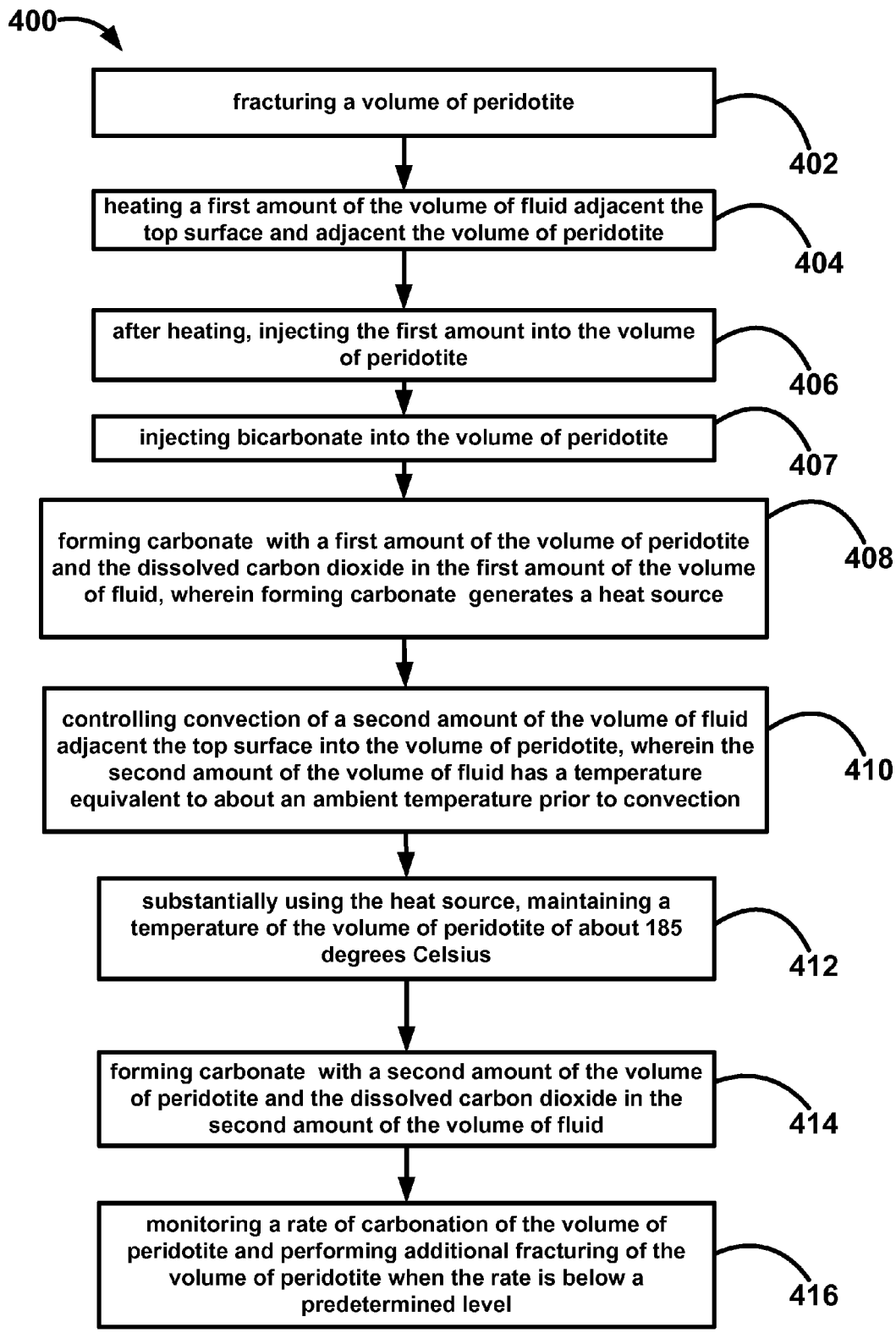
FIG. 4 is a chart of a method according to some embodiments of the disclosed subject matter.

Referring now to FIGS. 3 and 4, some embodiments of the disclosed subject matter include methods of enhancing rates of carbonation of peridotite using a natural source of carbon dioxide, e.g., the dissolved carbon dioxide in seawater covering the peridotite. As shown in FIG. 3, for a volume 300 of peridotite that is located close to a floor 302 and a top surface 303 of a body 304 of water, e.g., an ocean or sea, controlled convection of seawater 306 into and out of the volume of peridotite (as indicated by arrows) can be used to both heat the peridotite to a temperature suitable for carbonation and to provide a source of carbon dioxide for the carbonation reactions.

Referring now to FIG. 4, some embodiments include a method 400 of enhancing rates of carbonation of peridotite. At 402 of method 400, a volume of peridotite is fractured. As mentioned above, the volume of peridotite is typically located beneath a volume of fluid such as a sea or an ocean. The volume of fluid includes dissolved carbon dioxide. At 404, a first amount of the volume of fluid adjacent a top surface and adjacent the volume of peridotite is heated. Typically, the volume of peridotite is heated to about 185 degrees Celsius, which, as described further below, is a substantially optimal temperature for promoting carbonation reactions. At 406, after heating, the first amount of the volume of fluid, e.g., heated seawater in some embodiments, is injected into the volume of peridotite. At 407, bicarbonate materials are injected into the volume of peridotite. At 408, carbonate is formed with a first amount of the volume of peridotite and the dissolved carbon dioxide in the first amount of the volume of fluid. At the same time carbonate is formed, heat from the exothermic carbonation reactions generates a heat source for maintaining the temperature of the volume of peridotite. At 410, convection of a second amount of the volume of fluid adjacent the top surface into the volume of peridotite is controlled. The second amount of the volume of fluid has a temperature equivalent to about an ambient temperature prior to convection. At 412, substantially using the heat source, a temperature of the volume of peridotite is maintained at about 185 degrees Celsius. At 414, carbonate is formed with a second amount of the volume of peridotite and the dissolved carbon dioxide in the second amount of the volume of fluid. At 416, a rate of carbonation of the volume of peridotite is monitored and additional fracturing of the volume of peridotite is performed when the rate is below a predetermined level.

Figure 5:
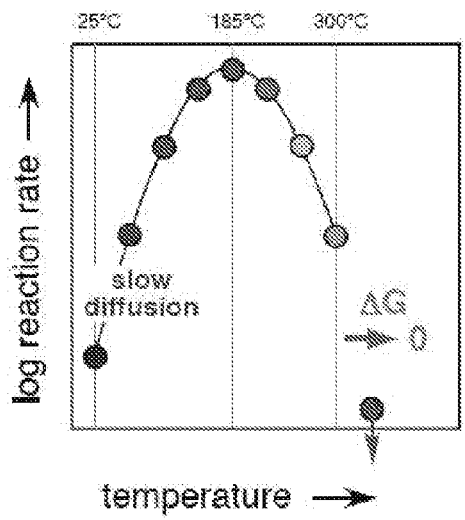
FIG. 5 is a chart of the reaction rate vs. temperature, which shows the typical carbonation rate of olivine.
Figure 6:
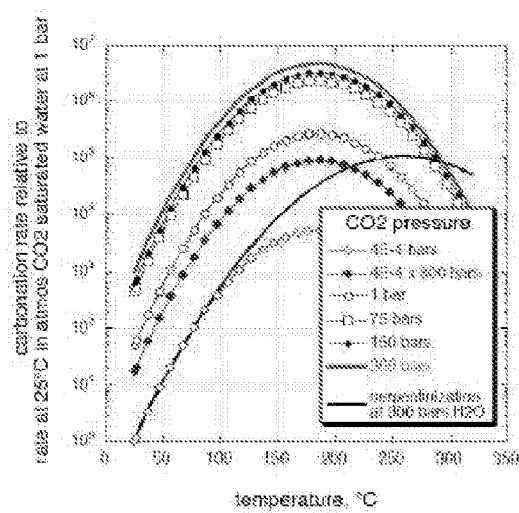
FIG. 6 is a chart of the rates of olivine carbonation and serpentinization as a function of temperature and pressure.
Figure 7:
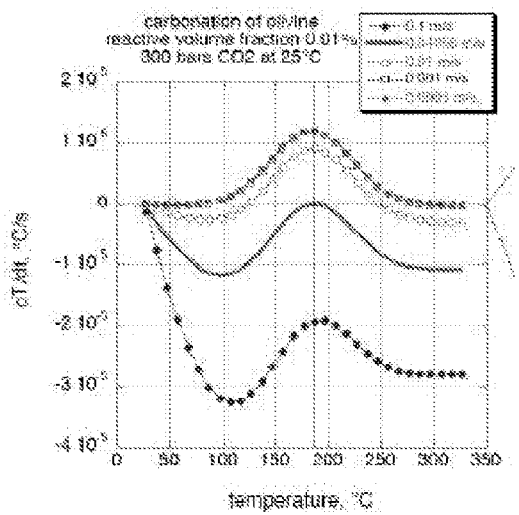
FIG. 7 is a chart of the rate of change of temperature due to olivine carbonation as a function of peridotite temperature and carbon dioxide fluid flow rate.

Referring now to FIGS. 5-7, research indicates that an additional increase in the carbonation rate, by a factor of more than about $10^6$ can be achieved by optimizing reaction conditions using methods and systems according to the disclosed subject matter, e.g., raising the temperature of the peridotite to an optimal temperature and injecting carbon dioxide at an optimal pressure and optimal flow rate.

As shown in FIGS. 5 and 6, heating and raising the partial pressure of carbon dioxide can increase the carbonation rate by a factor of more than $10^6$ by speeding-up the diffusive kinetics of hydration and carbonation. However, the chemical potential driving the reaction is reduced as the temperature approaches the equilibrium phase boundary for serpentine or carbonate mineral stability. The combined effect yields a maximum reaction rate at a temperature intermediate between surface conditions and the equilibrium phase boundary. Solving equations [3] and [4], where the serpentinization rate is $$\Gamma = 0.00000100 \exp[-0.000209 (T-260°C.)^2] \quad [3]$$

and the carbonization rate is $$\delta \sim 1.15 \cdot 10^{-5} (P(CO_2), \text{bars})^{1/2} \exp[-0.000334 (T-185°C.)^2] \quad [4]$$

both in units of mass fraction/s, the reaction rate for serpentinization as a function of temperature was found to have a maximum value at about 260 degrees Celsius over a range of carbon dioxide pressures, while the rate of carbonation is optimized at about 185 degrees Celsius and about 150 to 300 bars carbon dioxide pressure.

Referring now to FIG. 7, the rate of change of temperature due to olivine carbonation was calculated at a carbon dioxide pressure of 300 bars as a function of peridotite temperature and carbon dioxide fluid flow rate. At high carbon dioxide flow rates with cold fluid, i.e., about 25 degrees Celsius, it has been found that the volume of peridotite cannot be heated by exothermic reactions. At low carbon dioxide flow rates, advective cooling is negligible and temperature can be controlled by exothermic heating and diffusive cooling. Optimal olivine carbonation rates have been found to occur when carbon dioxide fluid flow is adjusted to yield about dT/dt=0 at about 185 degrees Celsius. In equation 5 below, the fluid flow (w) is solved for when dT/dt=0 to find the flow rate where the temperature of a reacting volume is constant, $$dT/dt = (T_{in}-T)\rho_f C_p^f \phi w/(\rho_s C_p^s d) - (T-T_o)\kappa/d^2 + \Gamma(T)A\Delta H/[C_p^s(1-\phi)+C_p^f(\phi)] \quad [5]$$

For equation 5, $T_{in}$ is the temperature of incoming water or aqueous fluid (° C. or Kelvin), T is the current temperature in the volume, $T_o$ is the far field temperature, outside the volume, which is equal to the initial temperature in the volume, $\rho_f$ and $\rho_s$ are the densities of the fluid and solid, $C_p^f$ and $C_p^s$ are the heat capacities of the fluid and solid, $\phi$ is the porosity or volume fraction of fluid (non-dimensional, 1% in all calculations shown here), w is the fluid flow velocity (m/s), d is the dimension or "size" of the volume (m, 1000 m in all calculations shown here), $\kappa$ is the thermal diffusivity ($10^{-6}$ m$^2$/s), F is the reaction rate, which is a function of temperature (units of 1/s), A is the fraction of the rock available for reaction in the volume (non-dimensional), and $\Delta H$ is the enthalpy change due to reaction.

It was found that a constant peridotite temperature of about 185 degrees Celsius can be maintained by pumping 25 degrees Celsius carbon dioxide at about 0.040 m/s or by pumping 25 degrees Celsius $H_2O$ at about $4.1 \times 10^{-6}$ m/s.

It was found that the range of temperature derivatives and steady state flow rates at about 185 degrees Celsius are much larger for the olivine carbonation reaction than for serpentinization reactions. Heating due to hydration/serpentinization was found to be less effective than heating due to carbonation. This is partly because, for example at 1 bar and 25 degrees Celsius, ΔH is about 250 kJ/kg for serpentinization, while carbonation evolves about 760 kJ/kg, and partly because serpentinization is slower than carbonation for temperatures between 25 and 185 degrees Celsius (see FIG. 6).

As mentioned above, some embodiments of the disclosed subject matter include systems and methods for sequestering carbon dioxide via carbonation of peridotite ex situ. Polycrystalline rock fragments, rather than finely ground, mono-crystalline particles, can be used thereby producing grain size reduction and continuous exposure of fresh (non-carbonated) reactive surfaces with no input of energy for this purpose. Such systems and methods avoid a large proportion of the costs associated with grinding of rock. The reaction rates ex situ can also be optimized using [5].

Now referring to FIGS. 8-12, some embodiments of the disclosed subject matter include systems and methods for introducing a flow of seawater into sub-surface peridotite, or other reactive rock, to extract carbon dioxide from seawater to form solid carbonate minerals by reaction of peridotite or other rock with the seawater, thus resulting in both geologic carbon dioxide capture as well as storage.

Referring to FIGS. 8A-8D, seawater should generally be taken from the sea surface, where it is equilibrated with atmospheric carbon dioxide. The reaction of seawater with rock should typically take place beneath the seafloor, in order to minimize societal impact of potential rock deformation due to volume changes during reaction, fluid leakage to the surface, and/or fluid injection. In FIGS. 8A-8D, the water depth is marked with "a" and the depth of an upper drill hole beneath the seafloor is "b". Because the concentration of carbon dioxide (and other, related carbon species, including bicarbonate) in seawater is around 100 ppm, very large volumes of seawater must react with the rock in a relatively short time.

Extensive drilling, preferably of nearly horizontal holes, and hydraulic fracture around drill holes should be undertaken to expose as much rock as possible to reaction. In FIGS. 8-11, the length of these holes is marked with "e" and the width of the area exposed to fluid injection by hydraulic fracture is marked with "d". To create each reacting volume, two drill holes should be created, one above the other. The vertical spacing between the drill holes is marked with "c". Water should be injected into the lower hole, and recovered (as much as possible) via the upper hole. Seawater depleted in carbon dioxide should then be returned to the sea surface where it will react with the atmosphere to draw down atmospheric carbon dioxide.

Though thermal buoyancy might in principle drive flow of water through the holes, in order to hasten the reaction time, compression of the seawater to an injection pressure, ΔP, may be necessary. If the rock volume is initially hotter than the injection water, return flow of hot fluid returning in the upper drill hole can be used to heat injection fluid, and/or to generate electrical power for pumps. Leakage from this system to the seafloor will return water depleted in carbon dioxide to the ocean. However, if this return flow is deep in the water column, it will take longer to affect atmospheric carbon dioxide.

The rate of reaction of aqueous fluid with rock to form solid carbonate is a function of temperature and the partial pressure of carbon dioxide. Thus, our proposed method focused on placing a rock volume at the optimal temperature for peridotite carbonation (185° C.) and maintaining high $P_{CO2}$ in pore water with ~1 M NaCl and ~0.6 M NaHCO$_3$. Under these circumstances, exothermic mineral carbonation together with injection of cold fluid can yield nearly constant temperature, and positive solid volume changes due to mineral carbonation can yield reaction driven cracking Together, all these factors can in principle yield carbon dioxide uptake rates of 1 Gt per cubic km of rock per year. The result is a carbon dioxide storage mechanism that will likely require a supply of carbon dioxide captured elsewhere.

In order to achieve storage of millions to billions of tons of carbon dioxide storage with reasonable drilling costs, given the low concentration of carbon dioxide in seawater, reaction of very large volumes of seawater with rock is desired. Under these circumstances, heating of the injection fluid is largely impractical. The initial heat stored in the rock, and any exothermic heat production, are rapidly overwhelmed by flow of fluid, so that the rock quickly approaches the temperature of the injection fluid. For this reason, it is best to site plants for carbon dioxide capture and storage in tropical areas where the sea surface temperature is high. Because the water/rock ratio is high, and the rate of reaction of carbon dioxide to form solid carbonates is small in any specific rock volume, addition of a catalyst such as NaHCO$_3$ may not be necessary to achieve near-optimal reaction rates.

Referring again to FIGS. 8 and 9, illustrated is a system for drilling and injection from shore based sites into the shallow seafloor. In order to minimize the shoreline length required to achieve a given amount of carbon dioxide capture and storage, drill holes are spaced with distance "d", and can also be stacked vertically as shown in cross-section B-B' in FIG. 9B, with spacing between reacting volumes denoted by "f".

Referring now to FIGS. 10 and 11, some embodiments include a system for drilling and injection from tethered drill platforms in the ocean. Costs for such drilling are currently about ten times higher than the cost for drilling from onshore sites.

The flow rate through a reacting volume is generally limited by permeability and the height ("c" in FIGS. 8-12, z in equations [6] and [7] below and the claims) of the volume between the two drill holes. Given a constant permeability, one can adjust the vertical spacing between the pair of drill holes bounding a reacting volume. To achieve low cost for a desired carbon dioxide uptake in a given time, it is best to optimize the vertical spacing so that the supply of seawater is as rapid as possible (given the limitations of the reaction rate) but the largest possible rock volume is involved. Thus, the flow rate controlling supply of fluid carbon dioxide should be just equal to the reaction rate controlling consumption of fluid carbon dioxide to form solid carbonate minerals.

Neglecting buoyancy—and neglecting temperature change due to cooling or heating of rock volume by advection of fluid, diffusion of heat into or from surroundings, and heat production during hydration and carbonation reactions—the height of the reacting rock volume can be approximated by the following equation:

$$z \sim \{k\Delta P C^{sw}_{CO2}\rho_f/[\eta\rho_s\Gamma(T,P_{CO2},X)]\}^{1/2} \qquad [6]$$

which can be used with any carbonation rate expression expressed in terms of mass fraction of rock converted to carbonate per second and can apply to carbonation of olivine at different conditions, or to carbonation of other rocks and minerals.

Equation [6] can also be developed more specifically for carbonation of olivine in 1 M NaCl, 0.64 M NaHCO$_3$, aqueous solution as a function of temperature and $P_{CO2}$, as follows:

$$z \sim \{k\Delta P C^{sw}_{CO2}\rho_f/[\eta\rho_s A\ 1.15\ 10^{-5}\ (P_{CO2,bars})^{1/2}\exp\{-0.000334\ (T-185°\ C.)^2\}]\}^{1/2} \qquad [7]$$

where
k is permeability in m$^2$,
ΔP is fluid overpressure in Pa,
$C^{sw}_{CO2}$ is concentration of CO$_2$ in seawater,
$\rho_f$ is density of fluid in kg/m$^3$,
$\rho_s$ is density of solid rock in kg/m$^3$,
η is viscosity of fluid in Pa s,
A is reactive surface area term, relative to surface area of 70 micron spheres,
$P_{CO2,bars}$ is partial pressure in bars of CO$_2$~$C^{atm}_{CO2} \rho_f g d$, or $C^{atm}_{CO2} \rho_s g d$, depending on whether fluid pressure is hydrostatic or lithostatic,
$C^{atm}_{CO2}$ is concentration of CO2 in air,
g is acceleration due to gravity in m/s$^2$,
d is mean depth in meters of reacting volume extending from d−z/2 to d+z/2 (in FIG. 8, (2b+c)/2), and
T is temperature of reacting volume in ° C.

Given this constraint on the height of the reacting volume (the vertical spacing between drill holes), carbon dioxide consumption in kg/m$^2$ of surface area (length·width) of the reacting volume is then approximated by the following equation:

$$J = w\phi\rho_f C^{sw}_{CO2} = k\Delta P \rho_f C^{sw}_{CO2}/(\eta z) \qquad [8]$$

where in addition to the variables defined above, w is fluid flow velocity in m/s, or fluid flux per unit area in m$^3$/(m$^2$ s), and φ is porosity or instantaneous volumetric fluid fraction in the reacting volume.

Buoyancy driven flow of fluid through a permeability network can be used to promote mineral carbonation reactions between fluid and rock without pumping. Buoyancy forces can be approximated by the following equation:

$$\Delta\rho g \qquad [9]$$

with the difference in density between cold and hot fluid, multiplied by the acceleration due to gravity. This commonly corresponds to about 2000 Pascals per meter given density changes of a few hundred kg/m$^3$ over a temperature range of 200° C.

Natural crystalline rock permeabilities, for fracture porosity of about 0.01, are generally determined to be 10$^{-12}$ m$^2$ or less. As a result, for aqueous fluid viscosities of about 0.001 Pa s and porosity of about 0.01, Darcy flow velocities for buoyancy driven flow are as follows:

$$w = k\Delta\rho g/(\eta\phi) \sim 2\times 10^{-12}\, 10^3/10^{-5} \sim 2\, 10^{-4}\, \text{m/s} \qquad [10]$$

As follows, Darcy flux is wφ=kΔρg/η~2 10$^{-6}$ m/s [m$^3$/(m$^2$ s)], or, given density of fluid around 1000 kg/m$^3$, about 2×10$^{-3}$ kg/(m$^2$ s).

For seawater with CO$_2$ concentration of about 10$^{-4}$, this in turn is 2×10$^{-7}$ kg CO$_2$/(m$^2$ s). Even for a very large injection interface (e.g., 10,000 m long by 500 m wide) this is only 1 kg CO$_2$/s, or ~3 10$^4$ tons CO$_2$ per year. This calculation has been done using a permeability of 10$^{-12}$ m$^2$, which is a high value for natural permeability in crystalline rocks. More common estimates are 10$^{-14}$ or less for crystalline rocks more than a few km below the Earth's surface.

Referring now to FIGS. 12A-12D, for closely spaced drill holes connected by numerous hydraulic fractures, hydraulic fracture can increase permeability to values greater than 10$^{-12}$. In turn, the use of closely spaced drill holes, creating a reacting volume of small vertical extent, suggests that diffusive heating from the surrounding rock volume can maintain high temperature and rapid reaction rates.

To hold reaction temperature constant at a desired value, fluid flow can be regulated to a value less than the buoyancy driven flow rate. The following equation relates temperature change to advective cooling, diffusive heat exchange with the top and bottom of a semi-infinite tabular reaction zone, and the enthalpy of carbonation and hydration reactions:

$$dT/dt = (T_{in}-T)\rho_f C_p^f \phi w/(\rho_s C_p^s d_a) - 2(T-T_o)\kappa/d_d^2 + \{A[\Gamma_c(T,P_{CO2},X)\Delta H_c + [\Gamma_h(T,P_{H2O},X)\Delta H_h]/[C_p^s(1-\phi) + C_p^f(\phi)] \qquad [11]$$

where
t is time in s,
w is the flow velocity in m/s (or m$^3$/(m$^2$ s))
$T_{in}$ is the input fluid temperature in ° C.,
T is the temperature of the reacting volume in ° C.,
$T_o$ is the far field temperature around the reacting volume in ° C. (in this case, above and below the reacting volume)
$d_a$ is the distance for advection in m,
$d_d$ is the distance for diffusion in m,
$\rho_f$ is density of fluid in kg/m$^3$,
$\rho_s$ is density of solid rock in kg/m$^3$,
$C_p^f$ is heat capacity of the fluid in J/(kg K)
$C_p^s$ is heat capacity of the solid in J/(kg K)
$\Gamma_c(T,P_{CO2},X)$ is an expression relating the rate of mineral carbonation, in mass fraction per second, to temperature, the partial pressure of CO$_2$, and other aspects of fluid composition X,
$\Delta H_c$ is the enthalpy of the carbonation reaction in J/kg,
$\Gamma_c(T,P_{H2O},X)$ is an expression relating the rate of mineral hydration (serpentinization), in mass fraction per second, to temperature, the partial pressure of H$_2$O and other aspects of fluid composition X,
$\Delta H_h$ is the enthalpy of the carbonation reaction in J/kg,
φ is porosity or instantaneous volumetric fluid fraction in the reacting volume,
κ is the thermal diffusivity in the area around the reacting volume in m$^2$/s,
A is a proportionality constant related to the size of rock fragments (crack spacing, grain size).

Setting this equal to zero and solving for w yields the following fluid flow velocity at constant temperature:

$$w = \{2(T-T_o)\kappa/d_d^2 - A[\Gamma_c(T,P_{CO2},X)\Delta H_c + [\Gamma_h(T,P_{H2O},X)\Delta H_h]/[C_p^s(1-\phi)) + C_p^f(\phi)]\} / \{(T_{in}-T)\rho_f C_p^f/(\rho_s C_p^s d_a)\} \qquad [12]$$

The diffusion distance will vary over time, and can be approximated as follows:

$$d_d \sim \sqrt{(\kappa t)} \qquad [13]$$

Provided that permeability can be artificially increased to 10$^{-11}$ m$^2$ or more within a large, reacting volume, this formulation yields fast CO$_2$ uptake rates within narrow, tabular reacting volumes, and allows for vertical "stacking" of many such volumes using drill holes from a single site.

Methods and systems according to the disclosed subject matter offer benefits and advantages over known methods and systems. Under some conditions, exothermic peridotite alteration, i.e., serpentinization and carbonation, can sustain high temperature and rapid reaction, with carbonation up to 10$^6$ times faster than natural rates potentially consuming billions of tons of carbon dioxide per year.

The potential for mineral carbonation in peridotite is emphasized in the following: there is about 2.9×10$^{15}$ kg of carbon dioxide in the atmosphere, up from a pre-industrial value of about 2.2×10$^{15}$ kg. The Somali ophiolite in Oman is greater than 350 km long, about 40 km wide, and has an average thickness of about 5 km. Approximately 30 percent of this volume is residual mantle peridotite. Adding 1 percent by weight carbon dioxide to the peridotite would consume one-quarter of the estimated atmospheric carbon dioxide—an amount roughly equivalent to the increase since the industrial revolution. Converting all of the Mg cations in the peridotite to carbonate would consume about $7 \times 10^{16}$ kg of carbon dioxide. Other ophiolites of similar size are in Papua New Guinea (about 200×50 km in area), New Calcdonia (about 150×40 km), and along the east coast of the Adriatic Sea (several massifs of about 100×40 km).

Because methods and systems of mineral carbonation according to the disclosed subject matter utilize the chemical potential energy inherent in tectonic exposure of mantle peridotite at the Earth's surface, the optimal temperature for carbonation can be maintained in a rock volume at little expense. Further, rock volumes at depth are, inherently, at relatively high pressure and elevated temperature. Thus, compared to engineered, mineral carbonation "at the smokestack", methods and systems according to the disclosed subject matter do not involve quarrying and transportation of peridotite, processing of solid reactants via grinding and heat treatment, or maintaining high temperature and pressure in a reaction vessel. Instead, the major energy investments in methods and systems according to the disclosed subject matter are for drilling, hydraulic fracturing, pumping fluid, preheating fluid, and purification of carbon dioxide. Also, unlike "smokestack" mineral carbonation, methods and systems according to the disclosed subject matter allow for both on-site carbon dioxide capture and transport of purified carbon dioxide to the carbonation locality.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of enhancing rates of carbonation of peridotite, said method comprising:
   fracturing a volume of peridotite;
   heating said volume of peridotite;
   injecting an adjustable flow of carbon dioxide into said volume of peridotite;
   injecting bicarbonate materials into said volume of peridotite; and
   forming carbonate with said volume of peridotite and said carbon dioxide in an exothermic reaction thereby generating a self-sustaining heat source, said heat source heating said volume of peridotite.

2. The method of claim 1, wherein fracturing includes one of drilling holes in said volume of peridotite for receiving said adjustable flow of carbon dioxide, drilling holes in said volume of peridotite for fracturing said volume of peridotite, hydraulic fracturing, and a combination thereof.

3. The method of claim 1, wherein said bicarbonate materials include at least one of sodium bicarbonate, potassium bicarbonate, and lithium bicarbonate having a concentration of about 1 mole per liter with surrounding fluids.

4. The method of claim 1, wherein heating includes injecting heated fluids into said volume of peridotite.

5. The method of claim 1, wherein heating includes heating said volume of peridotite to at least about 185 degrees Celsius.

6. The method of claim 1, wherein said carbon dioxide has a temperature of about 25 degrees Celsius.

7. The method of claim 1, wherein injecting includes injecting said carbon dioxide having a pressure of about 300 bars at a flow rate of about 0.04 meters per second.

8. The method of claim 1, further comprising:
   monitoring a rate of carbonation of said volume of peridotite and performing additional fracturing of said volume of peridotite when said rate is below a predetermined level.

9. The method of claim 1, wherein said peridotite is one of in situ, ex situ grinded, ex situ not grinded, and a combination thereof.

10. The method of claim 1, further comprising cycling the fluid pressure in said volume of peridotite so as to form both fluid-saturated intervals and fluid-free, drying intervals in said volume of peridotite.

11. A system for sequestering carbon dioxide via carbonation of peridotite, said system comprising:
    a fracturing module for fracturing a volume of peridotite;
    a heating module for heating said volume of peridotite;
    an injection module including a carbon dioxide source and means for injecting carbon dioxide from said carbon dioxide source into said volume of peridotite and including a bicarbonate material source and means for injecting bicarbonate materials from said bicarbonate material source into said volume of peridotite; and
    a control module for monitoring a temperature of said volume of peridotite, for monitoring a pressure and temperature of said carbon dioxide, and for monitoring a rate of carbonation of said volume of peridotite.

12. The system of claim 11, wherein said fracturing module includes means for drilling holes in said volume of peridotite for receiving an adjustable flow of carbon dioxide, means for drilling holes in said volume of peridotite for fracturing said volume of peridotite, and means for hydraulic fracturing said volume of peridotite.

13. The system of claim 11, wherein said peridotite is one of in situ, ex situ grinded, ex situ not grinded, and a combination thereof.

14. A method of enhancing rates of carbonation of peridotite, said method comprising:
    fracturing a volume of peridotite, said volume of peridotite being located beneath a volume of fluid, said volume of fluid having a top surface and said volume of fluid including dissolved carbon dioxide;
    heating a first amount of said volume of fluid adjacent said top surface and adjacent said volume of peridotite;
    after heating, injecting said first amount into said volume of peridotite;
    injecting bicarbonate materials into said volume of peridotite; and
    forming carbonate with a first amount of said volume of peridotite and said dissolved carbon dioxide in said first amount of said volume of fluid, wherein forming carbonate generates a heat source.

15. The method of claim 14, wherein said peridotite is one of in situ, ex situ grinded, ex situ not grinded, and a combination thereof.

16. The method of claim 14, wherein said bicarbonate materials include at least one of sodium bicarbonate, potassium bicarbonate, and lithium bicarbonate having a concentration of about 1 mole per liter with surrounding fluids.

17. The method of claim 14, further comprising:
    controlling convection of a second amount of said volume of fluid adjacent said top surface into said volume of peridotite, wherein said second amount of said volume of fluid has a temperature equivalent to about an ambient temperature prior to convection;
    using said heat source, maintaining a temperature of said volume of peridotite of about 185 degrees Celsius; and forming carbonate with a second amount of said volume of peridotite and said dissolved carbon dioxide in said second amount of said volume of fluid.

18. A method of enhancing rates of carbonation of peridotite, said method comprising:
  fracturing a volume of peridotite;
  injecting an adjustable flow of carbon dioxide into said volume of peridotite;
  injecting bicarbonate materials into said volume of peridotite; and
  forming carbonate with said volume of peridotite and said carbon dioxide in an exothermic reaction thereby generating a self-sustaining heat source, said heat source heating said volume of peridotite.

19. A method of enhancing rates of carbonation of peridotite, said method comprising:
  fracturing a volume of peridotite, said volume of peridotite being located beneath a volume of fluid, said volume of fluid having a top surface and said volume of fluid including dissolved carbon dioxide;
  injecting a first amount of said volume of fluid into said volume of peridotite;
  injecting bicarbonate materials into said volume of peridotite; and
  forming carbonate with a first amount of said volume of peridotite and said dissolved carbon dioxide in said first amount of said volume of fluid, wherein forming carbonate generates a heat source.

20. A system for sequestering carbon dioxide via carbonation of peridotite, said system comprising:
  a fracturing module for fracturing a volume of peridotite;
  an injection module including a carbon dioxide source and means for injecting carbon dioxide from said carbon dioxide source into said volume of peridotite and including a bicarbonate material source and means for injecting bicarbonate materials from said bicarbonate material source into said volume of peridotite; and
  a control module for monitoring a temperature of said volume of peridotite, for monitoring a pressure and temperature of said carbon dioxide, and for monitoring a rate of carbonation of said volume of peridotite.

* * * * *